2,716,648

HYDANTOIN DERIVATIVES

Leonard H. Jules, John A. Faust, and Melville Sahyun, Santa Barbara, Calif., assignors, by mesne assignments, to Cutter Laboratories, Inc., Berkeley, Calif., a corporation of California No Drawing. Application May 27, 1954, Serial No. 432,944

4 Claims. (Cl. 260—309.5)

This invention relates to a substituted hydantoin and certain derivatives thereof, and is more particularly concerned with 7,8-benzo-1,3-diazaspiro(4.5)decane-2,4-dione, having the following formula:

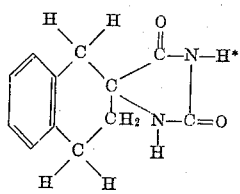

and to materials wherein the asterisk hydrogen is replaced by an alkali metal or a lower-alkyl group.

The compounds of the present invention, in direct contrast to the anticonvulsants of the prior art, have indicated an outstanding utility in preliminary pharmacological testing for inhibiting or otherwise preventing convulsions occurring through both electro shock and chemical shock obtained by Metrazol. As is well known, there are two types of convulsants which are usually tested in pharmacological procedures. One is the convulsion due to an applied current, and certain types of anticonvulsants are active against this inducement. Other convulsions may be induced by the drug Metrazol, and certain anticonvulsants are active against this type of convulsion inducement. However, there have been no compounds which have a strong potency against both kinds of induced convulsions. Diagnosis before the prescription of one or the other type of anticonvulsants was, therefore, a very carefully considered problem. But, with the provision of the compounds of the present invention, such problems are not presented.

It is, therefore, a principal object of the present invention to provide a chemical compound having utility in the prevention and inhibition of both chemical and electrically induced convulsions. Still a further object of the present invention is to provide a readily synthesized compound for the above objective. Another object of the present invention is to provide 7,8-benzo-1,3-diazospiro(4.5)decane-2,4-dione and certain derivatives thereof. Still a further object of the present invention is to provide a process for the preparation of such a compound and derivatives. Other objects will become apparent hereinafter.

The compounds of the present invention are crystalline solids having relatively high melting points. The free dione of the present invention contains a slightly acidic hydrogen atom, so that its saturated aqueous solution has a pH slightly below 7.0. The compounds of the present invention have a relatively low solubility in water.

The preparation of the free dione may be readily accomplished by a condensation of 2-tetralone, potassium cyanide and ammonium carbonate in a water-miscible solvent inert to the reaction and reaction products. Representative solvents which are suitable include, for example, methanol, ethanol, propanol, isopropanol, et cetera, containing a slight amount of water. The reactants are mixed together and heated at about forty degrees centigrade. The preferred temperature for the reaction is between about 55 and 60 degrees centigrade, or, at reflux temperature of the reaction mixture. However, the reaction temperature is not a critical element of the present invention, it being necessary solely that sufficient contact of the reactants occurs for the cyclization and condensation to the formation of the hydantoin from the ketone group of the tetralone. After completion of the reaction, the free dione is separated in a conventional manner utilizing the acidic hydrogen to accomplish separation. One method includes washing with water, dissolving in an alkaline solution, and precipitating the dione by acidification.

Preparation of the alkali metal salts of the compounds of the present invention is readily accomplished by alkalinizing an aqueous solution of the free dione with lithium, sodium, potassium, rubidium, or cesium hydroxide, heating the resulting alkaline solution, removing the insoluble matter, cooling and recovering the alkali metal salt of the dione. This recovery may be accomplished in conventional manner, as by filtration, centrifugation, or decantation. The sodium salt of the free dione material is an amorphous white powder subject of hydration and melts at 94–106 degrees centigrade. The dehydrated salt may be prepared by heating the hydrate at a temperature above 100 degrees centigrade.

Preparation of 3-alkyl materials may be readily accomplished by contacting in an alkaline solution, the free dione with a suitable alkylating material such as, for example, dimethyl sulfate, diethyl sulfate, ethyl chloride, ethyl iodide, propyl bromide, butyl iodide, pentyl bromide, hexyl chloride, et cetera, and collecting the solid which results. This solid may be purified in conventional manner to provide a 3-alkyl-substituted dione material which is only slightly soluble in water.

The following examples are given to illustrate certain procedures whereby compounds of the present invention may be prepared, however, these examples are not to be construed as limiting.

*Example 1.—7,8-benzo-1,3-diazaspiro(4.5)decane-2,4-dione*

A mixture of 9.6 grams (0.066 mole) of 2-tetralone, 6.5 grams (0.1 mole) of potassium cyanide, 19.2 moles of ammonium carbonate, twenty milliliters of water, and sixty milliliters of ethanol, was heated by means of a water bath at 58–60 degrees centigrade for two hours. The precipitate, which gradually separated during the heating was separated, mixed with water, and collected in a Buchner funnel. After washing with water, the solid was dissolved in dilute sodium hydroxide, and the solution treated with charcoal. Upon acidification of this solution, there was precipitated a white solid, which, upon recrystallization from ethanol amounted to 7.7 grams (54 percent of the theoretical yield) of 7,8-benzo-1,3-diazaspiro (4.5)decane-2,4-dione, melting at 267–268 degrees centigrade.

*Example 2*

Sixteen and one-half grams (0.076 mole) of 7,8-benzo-1,3-diazaspiro(4.5)dione was added to a solution of 3.2 grams (0.08 mole) of sodium hydroxide in 75 milliliters of water. The mixture was heated to boiling and filtered while hot to remove the insoluble material. The clear filtrate was cooled and the white solid which separated isolated and air-dried. Sodium 7,8-benzo-1,3-diazaspiro(4.5)decane-2,4-dione hydrate melts at 94–106 degrees centigrade. After finally drying at 110 degrees centigrade for eight hours, there was obtained the anhydrous salt as a white solid weighing 8.9 grams (45 percent of the theoretical yield).

Analysis: Calculated for $C_{12}H_{11}N_2O_2Na$; N, 11.76. Found: 11.46.

*Example 3.—7,8-benzo-3-methyl-1,3-diazaspiro(4.5)-decane-2,4-dione*

A mixture of 10.8 grams (0.05 mole) of 7,8-benzo-1,3-diazaspiro(4.5)-decane-2,4-dione, 6.3 grams (0.05 mole) of dimethyl sulfate, two grams (0.05 mole) of sodium hydroxide, and 75 milliliters of water was heated in a water bath at 90–100 degrees centigrade for one and one-half hours, and the resulting mixture was refluxed for one-half hour. The solid, which separated during the heating, was collected, washed with water, and dried. Crystallization from isopropanol, resulted in 3.5 grams (30 percent of the theoretical yield) of 7,8-benzo-3-methyl-1,3-diazaspiro(4.5)decane-2,4-dione, as tiny colorless needles, melting at 181–182 degrees centigrade. This material is soluble to an extent of less than 0.5 percent in water at twenty degrees centigrade and its saturated aqueous solution has a pH of 6.45.

The following example illustrates an improved method for preparing the free dione material.

*Example 4.—7,8-benzo-1,3-diazaspiro(4.5)decane-2,4-dione*

A mixture of 154 grams (1.05 mole) of 2-tetralone, 91 grams (1.4 mole) of potassium cyanide, 269 grams (2.8 moles) of ammonium carbonate, 400 milliliters of water and 1200 milliliters of ethanol was stirred and heated at 55–60 degrees centigrade for eight hours. Dilute sodium hydroxide solution was added to dissolve the solid which has separated during the reaction period, and the alkaline solution was treated with decolorising charcoal. The solution was then acidified with dilute hydrochloric acid. The white solid which separated was isolated, dried and recrystallized from glacial acetic acid. There was thus obtained 191 grams (84 percent of the theoretical yield) of 7,8-benzo-1,3-diazaspiro-(4.5)decane-2,4-dione, melting at 267–268 degrees centigrade (corrected).

7,8-benzo - 1,3-diazaspiro(4.5)decane - 2,4-dione, when tested for its anticonvulsant activity against electro shock, showed that an effective anticonvulsant dose (ED50) is approximately 54 milligrams per kilogram, while its toxicity (MLD or LD50) was between 4500–5000 milligrams per kilogram, or even higher. In direct contrast thereto, and surprisingly, Merritt and Putnam, Journal of Epilepsia, 9, 51 (1945) have reported that 6,7-benzo-1,3-diazaspiro(4.5)decane-2,4-dione, a position isomer, has an effective anticonvulsant does (ED50) of 230 milligrams per kilogram, and a toxicity (MLD or LD50) of 450, indicating a therapeutic index of about 2.

Additionally, 7,8-benzo-1,3-diazaspiro(4.5)decane-2,4-dione has an effective dose ED50 in mice against Metrazol-induced convulsions interperitoneally of 97 milligrams per kilogram and orally of 102 milligrams per kilogram. This may be directly contrasted with an LD50 interperitoneally of between 4500 and 5000 milligrams per kilogram with an oral LD50 of greater than 10,000 milligrams per kilogram. These results indicate that the compounds of the present invention have outstanding utility as anticonvulsant agents.

Various modifications may be made in the present invention without departing from the spirit or scope thereof, and it is to be understood that we limit ourselves only as defined in the appended claims.

We claim:
1. A 7,8-benzo - 1,3-diazaspiro(4.5)decane - 2,4-dione having the formula:

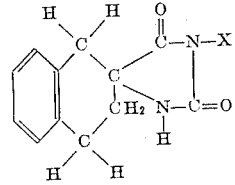

wherein X is selected from the group consisting of hydrogen, lower-alkyl and alkali metals.

2. 7,8-benzo-1,3-diazaspiro(4.5)decane-2,4-dione.
3. Sodium 7,8-benzo - 1,3-diazaspiro(4.5)decane - 2,4-dione.
4. 7,8-benzo-3-methyl - 1,3-diazaspiro(4.5)decane-2,4-dione.

References Cited in the file of this patent
UNITED STATES PATENTS 2,161,928   Miescher et al. _____ June 13, 1939

FOREIGN PATENTS 810,394   Germany _____ Aug. 9, 1951